United States Patent [19]

Hubert et al.

[11] Patent Number: 4,561,461
[45] Date of Patent: Dec. 31, 1985

[54] LIQUID DISTRIBUTION SYSTEM FOR CHEMICAL ENGINEERING APPARATUSES

[75] Inventors: Jean-Marie Hubert; Jean-Michel Bauer; Raïf Abouchar, all of Pagny-sur-Moselle, France

[73] Assignee: Le Carbone-Lorraine of Tour Manhattan, France

[21] Appl. No.: 732,814

[22] Filed: May 10, 1985

Related U.S. Application Data

[63] Continuation of Ser. No. 515,439, Jul. 19, 1983, abandoned, which is a continuation of Ser. No. 333,881, Dec. 23, 1981, abandoned.

[30] Foreign Application Priority Data

Dec. 24, 1980 [FR] France .................... 80 27416

[51] Int. Cl.⁴ .......................................... F15D 1/14
[52] U.S. Cl. .............................. 137/561 A; 210/519
[58] Field of Search ............. 137/561 A, 561 R, 599; 210/456, 519; 261/112

[56] References Cited

U.S. PATENT DOCUMENTS

| | | | |
|---|---|---|---|
| 2,193,696 | 3/1940 | Ramsaur | 137/561 A |
| 2,903,166 | 9/1959 | Kuljian | 137/561 R |
| 3,206,396 | 9/1965 | Davis | 210/456 |
| 3,384,114 | 5/1968 | Hathaway et al. | 137/561 R |
| 3,391,703 | 7/1968 | Kay | 137/561 R |
| 3,826,376 | 7/1974 | Carlson et al. | 210/519 |
| 4,085,040 | 4/1978 | Egan | 210/456 |
| 4,179,381 | 12/1979 | Baur | 210/456 |
| 4,182,376 | 1/1980 | Nilsson | 137/561 A |
| 4,230,575 | 10/1980 | Lizee | 210/456 |
| 4,302,338 | 11/1981 | Pfohl et al. | 137/561 A |
| 4,339,332 | 7/1982 | Jasperson | 210/456 |

FOREIGN PATENT DOCUMENTS

| | | | |
|---|---|---|---|
| 217654 | 6/1957 | Australia | 137/561 A |
| 279583 | 12/1970 | U.S.S.R. | 137/561 A |

*Primary Examiner*—Alan Cohan
*Assistant Examiner*—John A. Rivell

[57] ABSTRACT

A liquid distribution system for chemical engineering apparatuses comprises a liquid dividing means and an apertured distribution plate disposed below the liquid dividing means. The peripheries of the apertures in the plate are raised with respect to the surface of the plate.

The liquid dividing means may comprise elements such that the liquid flows along an inclined wall to the periphery of the apertured plate and the peripheries of the holes of the plate are raised with respect to its surface, e.g. by using tubes or bar members above the surface or grooves in the surface. The raised portions are provided with grooves or apertures.

This system is particularly suitable for absorbers of falling film, block or tube type, and for filled columns.

6 Claims, 4 Drawing Figures

LIQUID DISTRIBUTION SYSTEM FOR CHEMICAL ENGINEERING APPARATUSES

This application is a continuation of application Ser. No. 515,439, filed July 19, 1983, now abandoned, which is a continuation of application Ser. No. 333,881, filed Dec. 23, 1981, now abandoned.

The present invention relates to a liquid distribution system for chemical engineering apparatuses and in particular for absorbers of the falling-film, block and tube types and for filled columns.

It is known that the efficiency of an absorber or a filled column is greatly influenced by the way in which the liquid is distributed at the top of the apparatus. Various methods of distribution have already been proposed, including distributor tubes and perforated plates. The different systems concerned suffer from many disadvantages, including localized distribution of the liquid, fouling or clogging of the holes in the distributor, and lack of flexibility and high pressure drops in the case of perforated plates. In addition, a difficulty arises involving all the holes through which liquid flow takes place. Thus, the inclination of a perforated plate is sufficient to cause some holes to dry out and for other holes to be drowned owing to defects in flatness, and, if a pipe for the liquid feed is used, some holes are supplied with unequal amounts of liquid compared with others.

An improvement has been made in the perforated plate system by positioning in each hole an overflow tube which may or may not be notched in its upper part. It is found in fact that such a system provides for better distribution of the liquid and a reduction in pressure drops, but, because of the problem of horizontal positioning and the liquid level gradient caused by the lack of symmetry in the in-feed of the liquid, it still fails to involve all the holes in distribution of the liquid. Even when using this system, it is generally the practice for the absorption surface areas to be increased by 20% or more in order to compensate for the defects in distribution of the liquid.

According to the invention, a liquid distribution system comprises a liquid dividing means having elements such that liquid flows along an inclined wall to the periphery of a foraminate distribution plate disposed below the liquid dividing means, in which the periphery of each aperture in the plate is raised with respect to the surface of the plate, the raised portions being perforated or grooved at least at the level of the plane of the plate or at a distance that is at most equal to their height.

The shapes of the liquid dividing means and the plate depend on the geometry of the apparatus in which the distribution system is mounted.

By proceeding in accordance with the present invention, as will appear from the specific embodiments described below, it is possible to obtain a liquid distribution system that not only makes it possible to reduce the pressure drops but that also provides a virtually uniform flow of liquid in all the holes, and a high degree of operating flexibility as regards the admissible liquid flow rates.

In the accompanying drawings.

Figure 1:
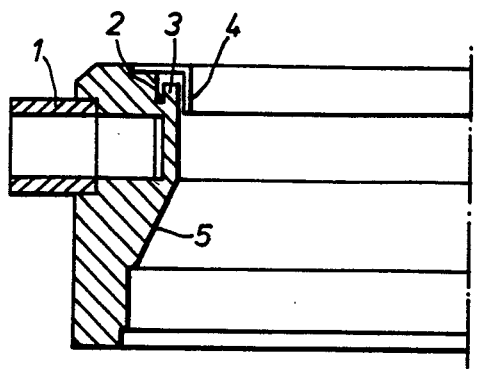
FIG. 1 is an embodiment of liquid-dividing means according to the invention.

In the liquid-dividing means of FIG. 1, liquid is introduced by way of a suitably oriented pipe 1, which does not pass the liquid directly onto the distribution plate but into a groove 2 provided with a barrier means 3 and a deflector 4.

This system allows a film of liquid to flow along an inclined wall 5, thus providing for distribution of the liquid over the whole of the periphery of the distribution plate.

Depending on the type of apparatus used, the groove 2 may be part-circular in cross-section and the wall 5 may be conically machined.

The raised portions around the peripheries of the holes may be formed by (a) adding small bar or rib members, (b) adding tubes, or (c) hollowing out grooves between the holes in the plate.

Figure 4:
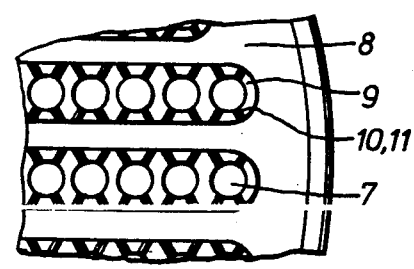
FIG. 4 is a plan view of FIG. 3.
Figure 2:
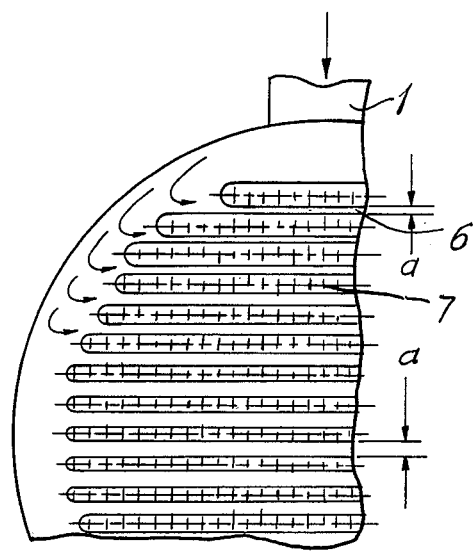
FIG. 2 is a view of part of another embodiment of the present invention.
Figure 3:
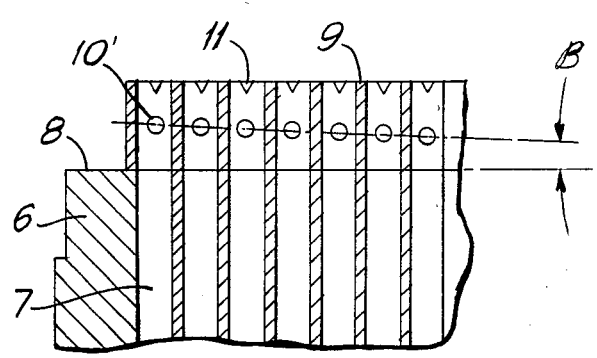
FIG. 3 is a partial sectional view of FIG. 2.

FIGS. 2, 3 and 4 show a construction in which the raised portions are formed by small bar members.

FIG. 2 is a plan view from above of about a quarter of a plate 6 which is apertured with rows of holes 7 at a constant pitch. The plate is a circular cylinder in this case but is could be of another form depending on the equipment for which it is intended.

FIG. 3 shows a sectional view (on a different scale for greater ease of reading the drawing) of a part of the plate 6, in which the peripheries of the holes 7 are raised with respect to the surface 8 of the plate by small bar members 9. In this case, the bar members are provided with grooves 10 at the level of the plate and grooves 11 in their upper part. The grooves could be replaced by perforations.

FIG. 4 is a plan view of FIG. 3.

The total sectional area of the perforations or grooves at the base of the raised portions is such that the minimum liquid flow rate of the installation causes a rise in the level of the liquid on the plate.

The attraction of such a system lies in the fact that a virtually constant level of liquid can be maintained over the whole of the plate, by virtue of the fact that the liquid arrives in a regular manner from the periphery of the plate and the perforations or grooves at the bottom of the raised portions produce pressure drops and therefore generate a hydraulic gradient.

This system also promotes operating flexibility at a variable flow rate since it makes it possible to operate in an overflow mode when the flow rate rises.

The system may be further improved, in particular in relation to distribution plates of large dimensions or large diameter, by seeking to achieve a horizontal level of liquid in dynamic flow. There are various possibilities in this respect, viz:

(a) the liquid dividing means can be positioned relative to the distribution plate in such a way that the axis of the intake pipe of the dividing means and the axis of the raised portions form an angle;

(b) the distance between raised portions (represented by a in the case of the bar members shown in FIG. 2) may differ in going from the periphery to the centre of the plate;

(c) the perforations or grooves at the bottom of the bar portions or the tubes may be replaced by perforations or grooves at a variable height from the periphery of the plate (high position) towards its centre (low position) in order to promote the flow of liquid towards the centre of the distribution plate.

Further improvement may result from selecting dimensions of the perforations or the grooves.

We claim:

1. In a liquid distribution system for use in chemical engineering apparatus comprising a liquid dividing means and a horizontal, flat distribution plate having holes and located under the dividing means, an inclined wall between the plate and the liquid dividing means, said liquid dividing means having a groove for incoming liquid and a deflector for causing liquid overflowing said groove to flow along the inclined wall to the periphery of the distribution plate, the holes in said plate being provided with raised portions which themselves contain perforations or grooves, the improvement that part of the grooves or perforations in said raised portions are located at variable heights from the periphery of the plate (high position) towards its center (low position).

2. In a liquid distribution system suitable for use in chemical engineering apparatus comprising a liquid dividing means and a horizontal, flat distribution plate having holes and located under the dividing means, an inclined wall between the plate and the liquid dividing means, said liquid dividing means having a groove for incoming liquid and a deflector for causing liquid overflowing said groove to flow along the inclined wall to the periphery of the distribution plate, the holes in said plate being provided with raised portions which themselves contain perforations or grooves, the improvement that the distance between said raised portions is different, going from the periphery to the center of the plate.

3. In an absorber including a liquid distribution system comprising a liquid dividing means and a horizontal, flat distribution plate having holes and located under the dividing means, an inclined wall between the plate and the liquid dividing means, said liquid dividing means having a groove for incoming liquid and a deflector for causing liquid overflowing said groove to flow along the inclined wall to the periphery of the distribution plate, the holes in said plate being provided with raised portions which themselves contain perforations or grooves, the improvement that part of the grooves or perforations in said raised portions are located at variable heights from the periphery of the plate (high position) towards its center (low position).

4. In an absorber including a liquid distribution system comprising a liquid dividing means and a horizontal, flat distribution plate having holes and located under the liquid dividing means, an inclined wall between the plate and the liquid dividing means, said liquid dividing means having a groove for incoming liquid and a deflector for causing liquid overflowing said groove to flow along the inclined wall to the periphery of the distribution plate, the holes in said plate being provided with raised portions which themselves contain perforations or grooves, the improvement that the distance between said raised portions is different, going from the periphery to the center of the plate.

5. In a liquid distribution system suitable for use in chemical engineering apparatus comprising a liquid dividing means and a horizontal, flat distribution plate having holes and located under the dividing means, an inclined wall between the plate and the liquid dividing means, said liquid dividing means having an inlet pipe, a groove for receiving liquid from said pipe and a deflector for causing liquid overflowing said groove to flow along the inclined wall to the periphery of the distribution plate, the holes in said plate being provided with raised portions which themselves contain perforations or grooves, the improvement that an axis of the intake pipe and a major axis of the raised portions are at an angle.

6. In an absorber including a liquid distribution system comprising a liquid dividing means and a horizontal, flat distribution plate having holes and located under the dividing means, an inclined wall between the plate and the liquid dividing means, said liquid dividing means having an inlet pipe, a groove for receiving liquid from said pipe and a deflector for causing liquid overflowing said groove to flow along the inclined wall to the periphery of the distribution plate, the holes in said plate being provided with raised portions which themselves contain perforations or grooves, the improvement that an axis of the intake pipe and a major axis of the raised portions are at an angle.

* * * * *

UNITED STATES PATENT AND TRADEMARK OFFICE
CERTIFICATE OF CORRECTION

PATENT NO. : 4,561,461

DATED : December 31, 1985

INVENTOR(S) : Jean-Marie Hubert et al

It is certified that error appears in the above-identified patent and that said Letters Patent are hereby corrected as shown below:

[73]  assignee:  LE CARBONE LORRAINE

Signed and Sealed this

Twenty-sixth Day of August 1986

[SEAL]

Attest:

DONALD J. QUIGG

Attesting Officer

Commissioner of Patents and Trademarks